United States Patent
Lersch

(10) Patent No.: US 10,364,170 B2
(45) Date of Patent: Jul. 30, 2019

(54) ELECTROMAGNETIC FLUID TREATMENT APPARATUS

(71) Applicant: Chemfree H20, LLC, Chandler, AZ (US)

(72) Inventor: John Robert Lersch, Chandler, AZ (US)

(*) Notice: Subject to any disclaimer, the term of this patent is extended or adjusted under 35 U.S.C. 154(b) by 326 days.

(21) Appl. No.: 14/724,783

(22) Filed: May 28, 2015

(65) Prior Publication Data

US 2015/0344334 A1    Dec. 3, 2015

Related U.S. Application Data

(60) Provisional application No. 62/003,770, filed on May 28, 2014.

(51) Int. Cl.
*C02F 1/48* (2006.01)

(52) U.S. Cl.
CPC ........ *C02F 1/485* (2013.01); *C02F 2201/483* (2013.01); *C02F 2303/22* (2013.01)

(58) Field of Classification Search
CPC .... C02F 1/484; C02F 1/485; C02F 2201/483; C02F 2303/22; B03C 1/0335; B03C 1/288
USPC ........................................ 210/222, 223, 695
See application file for complete search history.

(56) References Cited

U.S. PATENT DOCUMENTS

| | | | | |
|---|---|---|---|---|
| 3,616,922 A * | 11/1971 | Turnock | ..................... | B03C 1/28 210/222 |
| 4,279,139 A * | 7/1981 | Schmitz | ..................... | B21B 1/09 72/177 |
| 4,304,667 A * | 12/1981 | Dubourg | ................ | B01D 35/06 210/223 |
| 4,569,758 A * | 2/1986 | Sandulyak | .............. | B03C 1/034 210/222 |
| 5,622,622 A * | 4/1997 | Johnson | ..................... | A61L 2/02 210/192 |
| 5,871,642 A * | 2/1999 | Meeks | ..................... | C02F 1/481 210/222 |
| 6,325,942 B1 * | 12/2001 | Freije, III | .............. | B01J 19/087 210/222 |
| 9,850,148 B2 * | 12/2017 | Kolstad | ..................... | C02F 1/74 |
| 2014/0140893 A1 * | 5/2014 | Kohler | ..................... | A61L 9/20 422/128 |

(Continued)

FOREIGN PATENT DOCUMENTS

GB    2160855 A *   1/1986   .............. C02F 1/481

*Primary Examiner* — David C Mellon

(57) ABSTRACT

Devices and systems for electromagnetic treatment of fluids are provided. In various embodiments, an electromagnetic fluid treatment apparatus comprises a first rod spacer, a second rod spacer, and at least one conductive rod. In various embodiments, the first rod spacer comprises a fluid pipe aperture and at least one rod aperture, and the second rod spacer comprises a fluid pipe aperture and at least one rod aperture wherein the rod aperture of the first rod spacer and the rod aperture of the second rod spacer are circumferentially aligned about a centerline axis. In various embodiments, the conductive rod comprises a first attachment portion and a second attachment portion, wherein the first attachment portion is disposed in the rod aperture of the first rod spacer, the second attachment portion is disposed in the rod aperture of the second rod spacer, and the conductive rod extends therebetween.

9 Claims, 6 Drawing Sheets

(56) References Cited

U.S. PATENT DOCUMENTS

2016/0016829 A1\* 1/2016 Hughes .................. C02F 1/487
204/661
2016/0207812 A1\* 7/2016 Joo et al. ................ C02F 1/485

\* cited by examiner

ELECTROMAGNETIC FLUID TREATMENT APPARATUS

CROSS-REFERENCE TO RELATED APPLICATION

This application is a non-provisional of U.S. provisional patent application Ser. No. 62/003,770, entitled "Electromagnetic Fluid Treatment Apparatus," filed on May 28, 2014, which is incorporated herein by reference.

FIELD OF THE DISCLOSURE

The present disclosure relates to the treatment of fluid and, in particular, to the treatment of water using electromagnetism.

BACKGROUND OF THE DISCLOSURE

Hard water containing high levels of calcium, magnesium, and various other elements or minerals tends to form scale deposits on the inside surfaces of plumbing and other fluid circulation systems. Scale deposits can have detrimental effects on such systems, including restricted fluid flow, impaired efficiency, galvanic corrosion, and overheating, among others. Treatment of fluids such as hard water with electromagnetism has been shown to reduce scale formation.

SUMMARY OF THE DISCLOSURE

The present disclosure provides devices and systems for electromagnetic treatment of fluids. In various embodiments, an electromagnetic fluid treatment apparatus comprises a first rod spacer, a second rod spacer, and at least one conductive rod extending therebetween. In various embodiments, the conductive rod may comprise a solid core at least partially surrounded by a wire coil. In various embodiments, a magnetic field may be generated in response to conduction of a current through the wire coil. In various embodiments, an electromagnetic fluid treatment apparatus comprises a plurality of conductive rods and, in response to conduction of a current through a plurality of wire coils, a plurality of adjacent or overlapping magnetic fields may be generated.

In various embodiments, an electromagnetic fluid treatment assembly comprises a fluid pipe and at least one an electromagnetic fluid treatment apparatus at least partially surrounding the fluid pipe. In various embodiments, a plurality of magnetic fields may be generated in response to conduction of a current through the wire coil such that fluid disposed in the fluid pipe passes through a generated magnetic field. In various embodiments, treatment of fluid with a generated magnetic field can minimize or prevent mineral scaling. In various embodiments, an axial separation distance may separate electromagnetic fluid treatment apparatuses. In various embodiments, the polar orientation of adjacent electromagnetic fluid treatment apparatuses may be the same, or may be opposite. In various embodiments, the electromagnetic fluid treatment assembly may further comprise a container and/or a resin disposed in the container.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, the apparatus and assemblies may find particular use in connection with electromagnetic treatment of water. However, various aspects of the disclosed embodiments may be adapted for optimized performance with a variety of fluids and with a variety of fluid communication and/or circulation systems. As such, numerous applications of the present disclosure may be realized.

In various embodiments of the present disclosure an electromagnetic fluid treatment apparatus may be used to treat fluid, such as hard water, with one or more magnetic fields. Such treatment can minimize or prevent scaling of minerals present in the fluid and/or deposition of scale on the inside surfaces of plumbing and other fluid circulation systems. In various embodiments, an electromagnetic fluid treatment assembly may comprise one or more conductive rods disposed about a fluid pipe. Application of electrical current to the conductive rods may generate one or more magnetic fields that pass through the fluid pipe and any fluid disposed therein. In various embodiments, a plurality of magnetic fields is generated such that all fluid passing through the electromagnetic fluid treatment assembly passes through a generated magnetic field.

Figure 1:
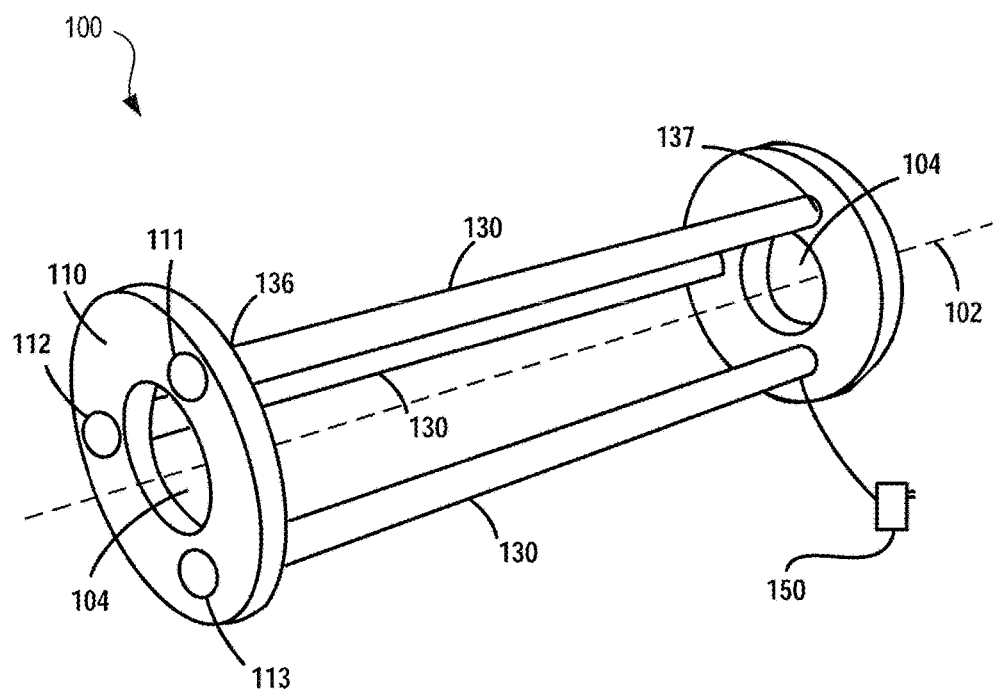
FIG. 1 illustrates a perspective view of an electromagnetic fluid treatment apparatus in accordance with various embodiments.

In various embodiments and with reference to FIG. 1, an electromagnetic fluid treatment apparatus 100 may comprise a first rod spacer 110 and a second rod spacer 120. Rod spacers 110, 120 may be oriented about a centerline axis 102. In various embodiments, rod spacers 110, 120 may comprise a fluid pipe aperture 104 extending axially through rod spacers 110, 120. Fluid pipe aperture 104 of rod spacers 110, 120 may be oriented about centerline axis 102. As used herein, references to axial, radial, and circumferential positions and/or distances refer to positions relative to centerline axis 102.

In various embodiments, rod spacers 110, 120 may comprise a non-conductive material. For example, in various embodiments, rod spacers 110, 120 may comprise polypropylene, polyethylene, or any other non-conductive polymer or plastic. However, in various embodiments, rod spacers 110, 120 may comprise any non-conductive material suitable for use in an electromagnetic fluid treatment apparatus.

In various embodiments, rod spacers 110, 120 may be configured to receive at least one conductive rod 130 (discussed below). In various embodiments, rod spacers 110, 120 may be configured to disposed conductive rod 130 in a particular position relative to other portions of the electromagnetic fluid treatment apparatus.

Figure 2:
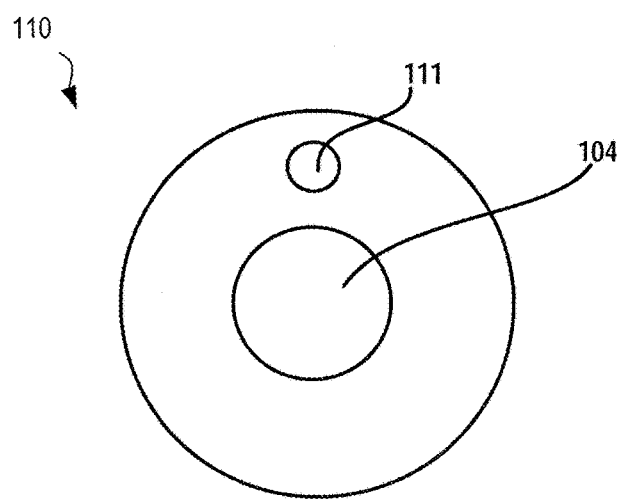
FIG. 2 illustrates a cross section view of a rod spacer in accordance with various embodiments.

In various embodiments, rod spacers 110, 120 may further comprise at least one rod aperture 111, 112, 113 extending axially through rod spacers 110, 120. With reference to FIGS. 1 and 2, rod apertures 111, 112, 113 may be disposed radially outward of fluid pipe aperture 104. In various embodiments, rod apertures 111, 112, 113 may be disposed at substantially equal radial distances from centerline axis 102. Stated differently, rod apertures 111, 112, 113 may be radially aligned about centerline axis 102.

Figure 3:
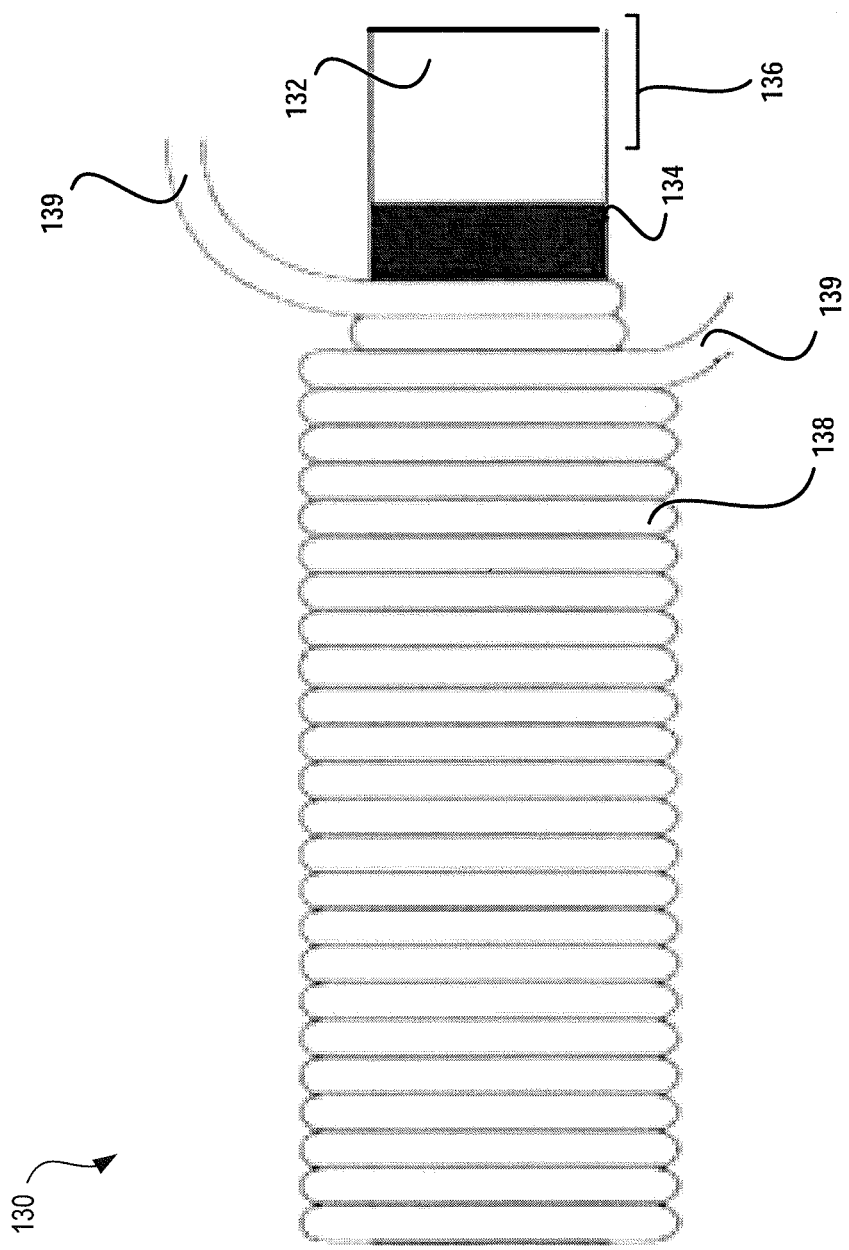
FIG. 3 illustrates a cross section view of a partial conductive rod in accordance with various embodiments.

In various embodiments, electromagnetic fluid treatment apparatus 100 may comprise at least one conductive rod 130 disposed between, and coupled to, first rod spacer 110 and second rod spacer 120. With reference to FIGS. 1 and 3, conductive rod 130 may comprise a core 132. In various embodiments, core 132 may comprise a solid cylinder. However, in various embodiments, core 132 may comprise any suitable shape for use in an electromagnetic fluid treatment apparatus.

In various embodiments, a solid core may increase the strength and/or alter the shape of a magnetic field generated by electromagnetic fluid treatment apparatus 100. For example, in various embodiments, an axially elongated toroid-shaped magnetic field may be generated by electromagnetic fluid treatment apparatus 100. In various embodiments, an axially elongated toroid-shaped magnetic field may treat fluid with a more uniform and more stable magnetic field.

Core 132 may comprise any suitable axial length. However, in various embodiments, axial length of core 132 may vary depending on a diameter of a fluid pipe (discussed below) to which the electromagnetic fluid treatment apparatus is attached. In various embodiments, core 132 may comprise an axial length substantially equal to four times the diameter of fluid pipe aperture 104. In various embodiments, a diameter of core 132 may vary depending on a diameter of the fluid pipe (discussed below). In various embodiments, core 132 may comprise a diameter of about one third the diameter of the fluid pipe to about one sixth the diameter of the fluid pipe. However, in various embodiments, core 132 may comprise any suitable diameter.

Core 132 may comprise a conductive metal such as cold rolled steel. However, in various embodiments, core 132 may comprise copper, aluminum, nickel, or any other metal, metal alloy, or other material suitably conductive for use in an electromagnetic fluid treatment apparatus.

In various embodiments, conductive rod 130 may further comprise a non-conductive layer 134. Non-conductive layer 134 may be wrapped around an outer circumference of core 132. In various embodiments, non-conductive layer 134 may be configured to at least partially surround core 132. For example, in various embodiments, non-conductive layer 134 may extend from a proximal, axial end of core 132 to a distal, axial end of core 132.

However, in various embodiments, non-conductive layer 134 may extend only partially between the proximal, axial end of core 132 and the distal, axial end of core 132. Stated differently, non-conductive layer may be disposed or set back by an axial distance from the proximal and distal axial ends of core 132. For example, in various embodiments, conductive rod 130 may further comprise a first attachment portion 136 and a second attachment portion 137. First attachment portion 136 may comprise a portion of core 132 disposed at the proximal, axial end of core 132 that is not surrounded by non-conductive layer 134. Stated differently, first attachment portion 136 may comprise an exposed core 132 of conductive rod 130. Second attachment portion 137 may comprise a portion of core 132 disposed at the distal, axial end of core 132 that is not surrounded by non-conductive layer 134. Stated differently, second attachment portion 137 may comprise an exposed core 132 of conductive rod 130. In various embodiments, attachment portions 136, 137 may comprise an axial length of 25.4 millimeters. However, attachment portions 136, 137 may comprise any suitable axial length.

In various embodiments, non-conductive layer 134 may comprise a non-conductive material. For example, in various embodiments, non-conductive layer 134 may comprise polypropylene, polyethylene, or any other non-conductive polymer or plastic. However, in various embodiments, non-conductive layer 134 may comprise any non-conductive material suitable for use in an electromagnetic fluid treatment apparatus.

Conductive rod 130 may further comprise a wire coil 138 disposed about the outer circumference of core 132. In various embodiments, wire coil 138 may be disposed radially outward of non-conductive layer 134. In various embodiments, wire coil 138 may comprise a metal wire wound tightly about core 132 such that a coil extends helically about the circumference of the core 132 and axially along core 132. In various embodiments, wire coil 138 may be wrapped upon itself around core 132 so that wire coil 138 begins and ends at substantially the same axial location relative to core 132. In various embodiments, wire coil 138 may be wrapped upon itself until at least two layers of wire are formed. In various embodiments, wire coil 138 may be wound to a radial thickness of about 3 millimeters, for example 3.175 millimeters. However, wire coil 138 may comprise any radial thickness suitable for use in an electromagnetic fluid treatment apparatus.

In various embodiments, wire coil 138 may extend from first attachment portion 136 to second attachment portion 137. In various embodiments, wire coil 138 may extend only partially between first attachment portion 136 and second attachment portion 137. Stated differently, wire coil 138 may be disposed or set back by an axial distance from a proximal, axial end of non-conductive layer 134 and/or a distal, axial end of non-conductive layer 134. In various embodiments, wire coil 138 may be disposed or set back the proximal and distal axial ends of core 132 by an axial distance of about 30 millimeters, for example 28.575 millimeters.

In various embodiments, wire coil 138 may comprise copper. However, in various embodiments, wire coil 138 may comprise any conductive metal, metal alloy, composite, or other material suitable for use in an electromagnetic fluid treatment apparatus.

In various embodiments, wire coil 138 may comprise at least one uncoiled wire portion 139. Uncoiled wire portion 139 may be disposed at a distal end or a proximal end of wire coil 138. In various embodiments, uncoiled wire portion 139 may be continuous with wire coil 139, but may not extend helically around a circumference of core 132. In various embodiments, wire coil 139 may be electrically connected to other portions of electromagnetic fluid treatment apparatus 100.

Figure 4A:
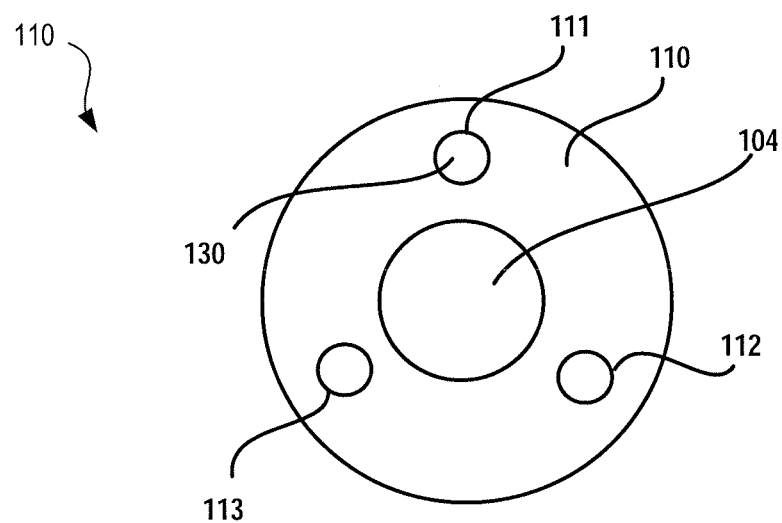
FIG. 4a illustrates an end view of an electromagnetic fluid treatment apparatus in accordance with various embodiments.

In various embodiments and with reference to FIGS. 1 and 4a, electromagnetic fluid treatment apparatus 100 may comprise a plurality of conductive rods 130 disposed between, and coupled to, first rod spacer 110 and second rod spacer 120. For example, electromagnetic fluid treatment apparatus 100 may comprise three conductive rods 130. For example, in various embodiments, a first conductive rod may be disposed in a first rod aperture 111 of rod spacers 110, 120, a second conductive rod may be disposed in a second rod aperture 112 of rod spacers 110, 120, and a third conductive rod may be disposed in a third rod aperture 113 of rod spacers 110, 120.

In various embodiments, conductive rods 130 may be disposed at substantially equal radial distances from centerline axis 102 and may be substantially parallel to centerline axis 102. Stated differently, conductive rods 130 may be radially aligned about centerline axis 102. In various embodiments, conductive rods 130 may be disposed circumferentially about centerline axis 102 at substantially equal intervals. For example, in various embodiments comprising three conductive rods 130, each conductive rod may be disposed 120 degrees away from conductive rods 130 circumferentially adjacent thereto.

Figure 4B:
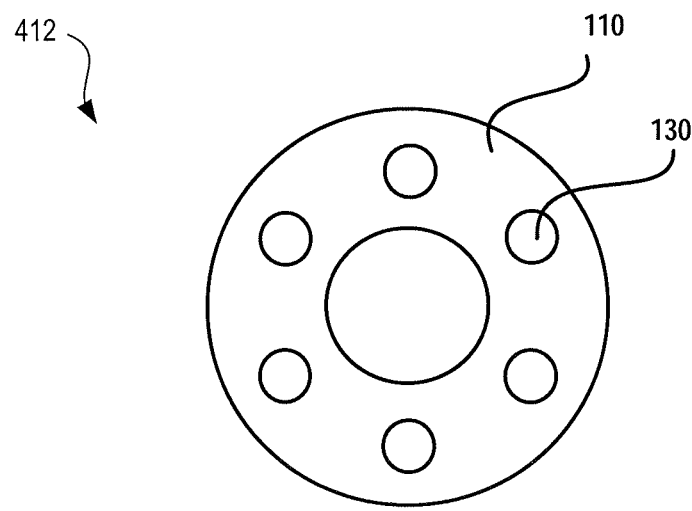
FIG. 4b illustrates an end view of an electromagnetic fluid treatment apparatus in accordance with various embodiments.
Figure 4C:
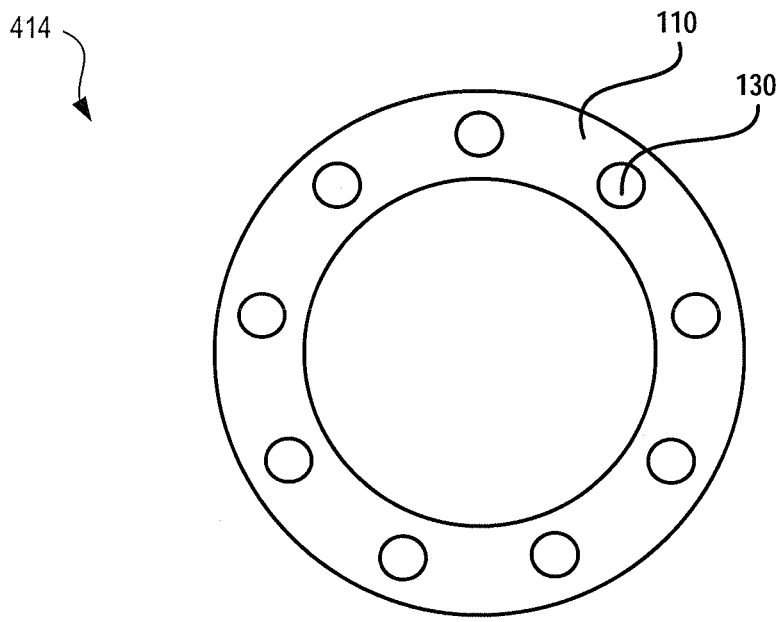
FIG. 4c illustrates an end view of an electromagnetic fluid treatment apparatus in accordance with various embodiments.
Figure 4D:
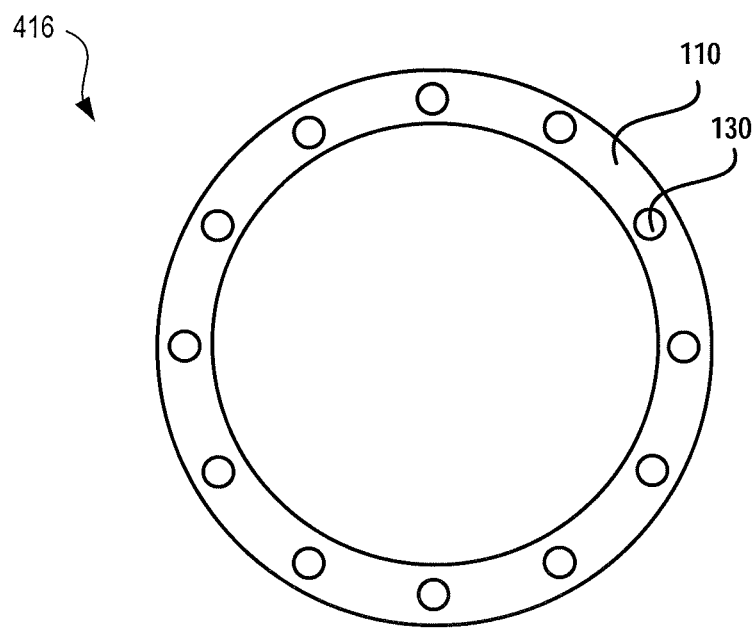
FIG. 4d illustrates an end view of an electromagnetic fluid treatment apparatus in accordance with various embodiments.

In various embodiments and with reference to FIG. 4b, electromagnetic fluid treatment apparatus 412 may comprise a first rod spacer 110 comprising six rod apertures, a second rod spacer comprising six rod apertures, and six conductive rods 130 disposed therebetween. In various embodiments and with reference to FIG. 4c, electromagnetic fluid treatment apparatus 414 may comprise a first rod spacer 110 comprising nine rod apertures, a second rod spacer comprising nine rod apertures, and nine conductive rods 130 disposed therebetween. In various embodiments and with reference to FIG. 4d, electromagnetic fluid treatment apparatus 416 may comprise a first rod spacer 110 comprising twelve rod apertures, a second rod spacer comprising twelve rod apertures, and twelve conductive rods 130 disposed therebetween. However, in various embodiments, the electromagnetic fluid treatment apparatus may comprise any number of conductive rods disposed between a first rod spacer and a second rod spacer.

Figure 5:
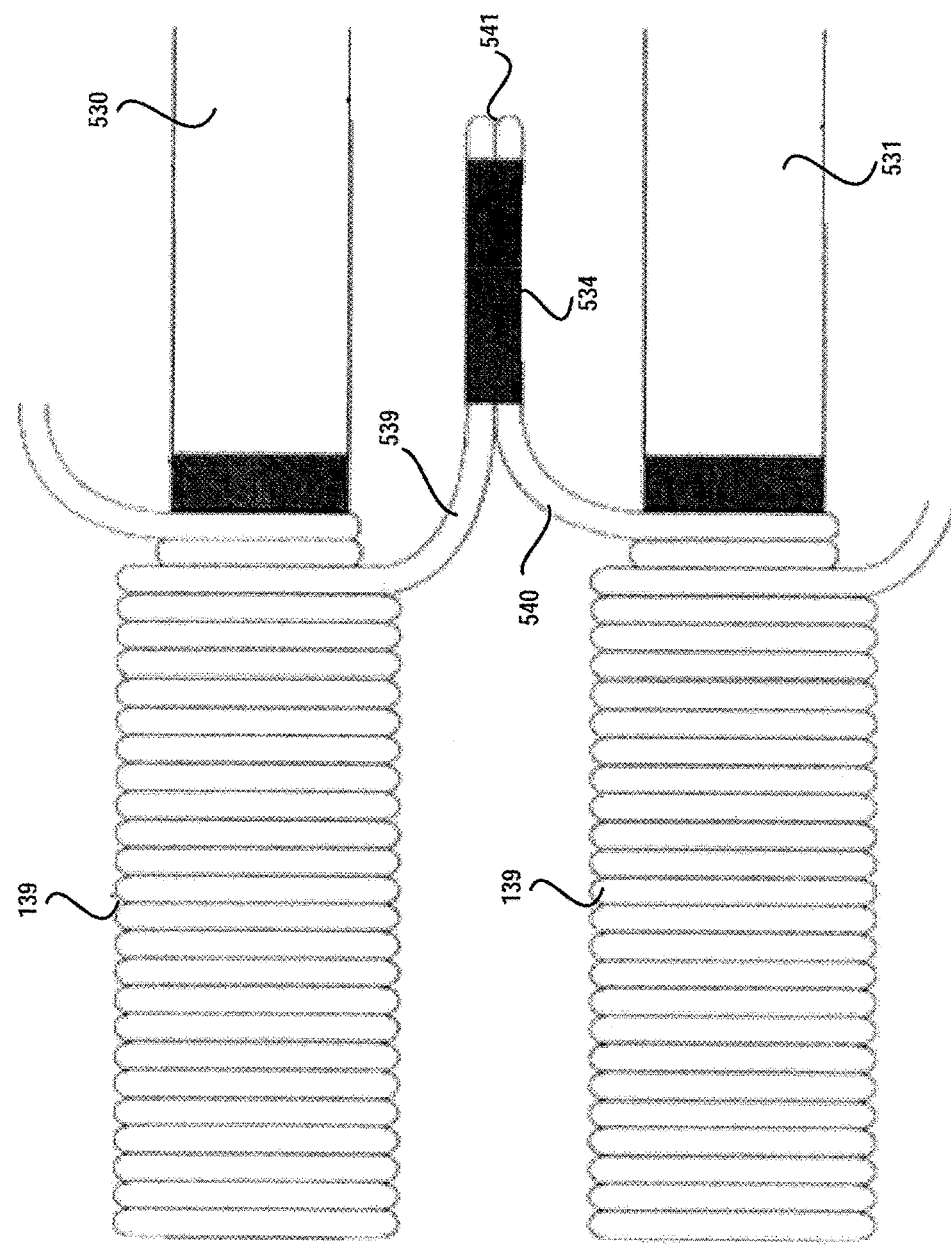
FIG. 5 illustrates a cross section view of a portion of conductor rods in accordance with various embodiments.

In various embodiments and with reference to FIG. 5, a first conductive rod 530 may be electrically connected to a second conductive rod 531. In various embodiments, a plurality of conductive rods may be electrically connected. For example, in various embodiments, a first uncoiled wire portion 539 of the first conductive rod 530 may be electrically connected to a second uncoiled wire portion 540 of the second conductive rod 531 by soldering, crimping, clamping, or the like to form a joined wire portion 541. In various embodiments, conductive rods may be electrically connected such that in response to an electrical current passing through wire coil 139, magnetic fields having similarly oriented polarity will be generated around each conductive rod.

In various embodiments, a non-conductive insulating material 534 may at least partially surround joined wire portion 541. In various embodiments non-conductive insulating material 534 may comprise a non-conductive material. For example, in various embodiments, non-conductive insulating material 534 may comprise polypropylene, polyethylene, or any other non-conductive polymer or plastic. However, in various embodiments, non-conductive insulating material 534 may comprise any non-conductive material suitable for use in an electromagnetic fluid treatment apparatus.

In various embodiments and with reference again to FIG. 1, electromagnetic fluid treatment apparatus 100 may further comprise a power element 150. Power element 150 may comprise a battery, electrical plug, or other suitable power source. In various embodiments, power element 150 may provide direct current. In various embodiments, power element 150 may provide from about 2.5 amps to about 3 amps of current to one or more conductive rods 130.

Figure 6:
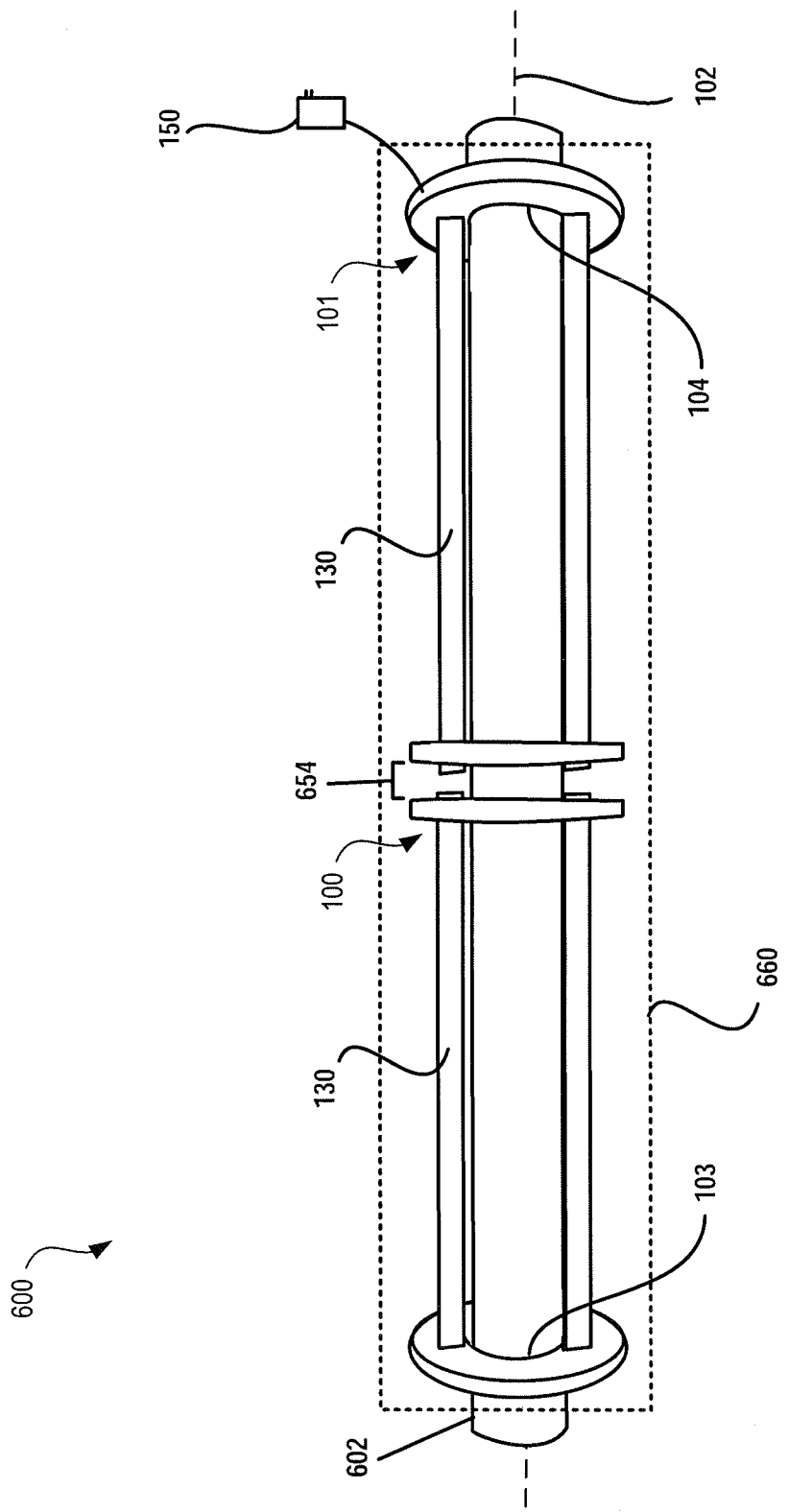
FIG. 6 illustrates a side view of an electromagnetic fluid treatment assembly in accordance with various embodiments.

In various embodiments, an electromagnetic fluid treatment assembly may comprise a fluid pipe and at least one electromagnetic fluid treatment apparatus. With reference to FIG. 6, an electromagnetic fluid treatment assembly 600 may comprise a fluid pipe 602, a first electromagnetic fluid treatment apparatus 100 and a second electromagnetic fluid treatment apparatus 101. Fluid pipe 302 may be at least partially surrounded by electromagnetic fluid treatment apparatuses 100, 101, and may extend along centerline axis 102 and through fluid pipe apertures 104 of electromagnetic fluid treatment apparatuses 100, 10.

In various embodiments, a core of conductive rods 130 may comprise an axial length substantially equal to four times the diameter of fluid pipe 602. In various embodiments, first electromagnetic fluid treatment apparatus 100 and second electromagnetic fluid treatment apparatus 101 may be disposed adjacent to one another on fluid pipe 602. In various embodiments, first electromagnetic fluid treatment apparatus 100 and second electromagnetic fluid treatment apparatus 101 may be separated by an axial separation distance 654. In various embodiments, axial separation distance 654 may comprise a distance of about 3.175 millimeters to about 6.35 millimeters. In various embodiments, the axial separation distance may change the angle and the strength of at least one magnetic field created in response to conducting electrical current through a wire coil of electromagnetic fluid treatment assembly 600.

In various embodiments, electromagnetic fluid treatment assembly 600 may comprise at least one power element 150. Power element 150 may be electrically connected to at least one electromagnetic fluid treatment apparatus. In various embodiments, electromagnetic fluid treatment assembly 600 may comprise plurality of power elements electrically connected to a plurality of electromagnetic fluid treatment apparatuses. In various embodiments, power element 150 may supply power to a plurality of electromagnetic fluid treatment apparatuses connected in series or in parallel.

In various embodiments, at least one magnetic field is generated in response to conducting electrical current through a wire coil of electromagnetic fluid treatment assembly 600. In various embodiments, a plurality of adjacent and/or overlapping magnetic fields is generated so as to expose all fluid traveling through the fluid pipe to a magnetic field. In various embodiments, the polar orientation of adjacent electromagnetic fluid treatment apparatuses may be identical. In various embodiments, the polar orientation of adjacent electromagnetic fluid treatment apparatuses may be different.

In various embodiments, electromagnetic fluid treatment assembly 600 may further comprise a container 660. Container 660 may be configured to at least partially surround other portions of electromagnetic fluid treatment assembly 600 such as the electromagnetic fluid treatment apparatuses. In various embodiments, container 660 may comprise an aluminum pipe. However, container 660 may comprise any shape and any material suitable for use in an electromagnetic fluid treatment assembly.

In various embodiments, container 660 may be at least partially filled with a protective resin. In various embodiments, the resin may comprise urethane or any other suitable potting compound. However, the resin may comprise any heat-absorbent and/or non-conductive material suitable for use in an electromagnetic fluid treatment assembly.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or feature of the present disclosure is intended to be dedicated to the public regardless of whether the element, component, or feature is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromagnetic fluid treatment assembly comprising:
    a fluid pipe oriented about a centerline axis; and
    an electromagnetic fluid treatment apparatus disposed about the fluid pipe and oriented about the centerline axis, the electromagnetic fluid treatment apparatus comprising:
        a first rod spacer, comprising a fluid pipe aperture configured to receive the fluid pipe and at least one rod aperture disposed radially outward of the fluid pipe aperture;
        a second rod spacer, comprising a fluid pipe aperture configured to receive the fluid pipe and at least one rod aperture disposed radially outward of the fluid pipe aperture, the rod aperture of the first rod spacer and the rod aperture of the second rod spacer being circumferentially aligned about a centerline axis; and
        at least one conductive rod, comprising a first attachment portion and a second attachment portion, wherein the first attachment portion is disposed in the rod aperture of the first rod spacer, the second attachment portion is disposed in the rod aperture of the second rod spacer, and the conductive rod extends between the first rod spacer and the second rod spacer;
        wherein the conductive rod comprises:
            a wire coil, disposed at least partially around a circumference of a core and at least partially between the first attachment portion and the second attachment portion; and
            a non-conductive layer, disposed between the core and the wire coil and at least partially between the first attachment portion and the second attachment portion;
            wherein the first attachment portion and the second attachment portion comprise an exposed core.

2. The electromagnetic fluid treatment assembly of claim 1, wherein the wire coil extends helically about the circumference of the core in a first direction for an axial coil distance and extends helically about the circumference of the core in a second direction for the axial coil distance.

3. The electromagnetic fluid treatment assembly of claim 2, further comprising an electric power element electrically connected to an uncoiled wire portion of the wire coil, the uncoiled wire portion being disposed at a distal end of the wire coil.

4. The electromagnetic fluid treatment assembly of claim 3, wherein the conductive rod comprises an axial length substantially equal to four times a diameter of the fluid pipe.

5. The electromagnetic fluid treatment assembly of claim 3, wherein a plurality of magnetic fields are generated in response to direct current conduction through the wire coil.

6. An electromagnetic fluid treatment assembly comprising:
    a fluid pipe oriented about a centerline axis; and
    a plurality of electromagnetic fluid treatment apparatuses disposed about the fluid pipe, wherein each electromagnetic fluid treatment apparatus comprises:

a first rod spacer, comprising a fluid pipe aperture configured to receive the fluid pipe and at least one rod aperture disposed radially outward of the fluid pipe aperture;

a second rod spacer, comprising a fluid pipe aperture configured to receive the fluid pipe and at least one rod aperture disposed radially outward of the fluid pipe aperture, the rod aperture of the first rod spacer and the rod aperture of the second rod spacer being circumferentially aligned about the centerline axis; and at least one conductive rod, comprising a first attachment portion, a second attachment portion, a core, a wire coil, and a non-conductive layer, wherein the first attachment portion comprises an exposed core and is disposed in the rod aperture of the first rod spacer, the second attachment portion comprises an exposed core and is disposed in the rod aperture of the second rod spacer, the conductive rod extends between the first rod spacer and the second rod spacer, the wire coil is disposed at least partially around a circumference of the core and at least partially between the first attachment portion and the second attachment portion, and the non-conductive layer is disposed between the core and the wire coil and at least partially between the first attachment portion and the second attachment portion;

wherein a first one of the plurality of electromagnetic fluid treatment apparatuses is electrically connected to an electric power element and to a second one of the plurality of electromagnetic fluid treatment apparatuses.

7. The electromagnetic fluid treatment assembly of claim 6, further comprising:

a container, configured to at least partially surround the plurality of electromagnetic fluid treatment apparatuses; and a resin, disposed within the container and external to the fluid pipe, the resin being configured to at least partially surround the plurality of electromagnetic fluid treatment apparatuses.

8. The electromagnetic fluid treatment assembly of claim 7, wherein an axial separation distance between the first one of the plurality of electromagnetic fluid treatment apparatuses and the second one of the plurality of electromagnetic fluid treatment apparatuses comprises about 3.175 millimeters to about 6.35 millimeters.

9. The electromagnetic fluid treatment assembly of claim 7, wherein the plurality of electromagnetic fluid treatment apparatuses are electrically connected in series.

\* \* \* \* \*